United States Patent [19]
Batchelor et al.

[11] Patent Number: 5,098,238
[45] Date of Patent: Mar. 24, 1992

[54] FASTENER WITH INTERNAL THREADED INSTALLATION MEANS

[75] Inventors: John S. Batchelor, Rugby; Edward G. Brooks, Great Glen Leicester, both of England

[73] Assignee: Hi-Shear Corporation, Torrance, Calif.

[21] Appl. No.: 631,712

[22] Filed: Dec. 20, 1990

[51] Int. Cl.$^5$ .................. F16B 19/00; F16B 35/02
[52] U.S. Cl. .................. 411/361; 411/43; 411/383; 411/407
[58] Field of Search .............. 411/43, 69, 70, 178, 411/383, 384, 407, 403, 410, 361

[56] References Cited

U.S. PATENT DOCUMENTS

| | | | |
|---|---|---|---|
| 209,603 | 11/1878 | Bidwell | 411/386 |
| 3,792,933 | 2/1974 | Stencel | 411/384 |
| 4,077,299 | 3/1978 | King, Jr. | 411/383 |
| 4,544,312 | 10/1985 | Stencel | 411/361 |

FOREIGN PATENT DOCUMENTS 2066402  7/1981  United Kingdom ........ 411/383

Primary Examiner—Neill R. Wilson
Attorney, Agent, or Firm—Donald D. Mon

[57] ABSTRACT

A fastener for use in fatigue resistant structures such as aircraft wings. The fastener is installed into interference fit by tool engagement in a tapped hole coaxial with the threaded end of the pin, at the threaded end of the fastener pin. The tapped hole is engaged by a hardened mandrel which is detachably threaded into the threaded hole in the pin. The mandrel has an extending tail end which may be gripped by a pulling tool after the threaded end of the pin is partially inserted into the workpiece with the mandrel extending through the workpiece. The tail end of the mandrel is engaged by a pulling tool that can be manually or power actuated to pull the interference fit shank into the structure workpiece to produce a fatigue resistant interference between the pin shank diameter and the workpiece hole diameter. The process results in fatigue-proofing the join and produces the benefit of holding the pin from rotation when a threaded collar or nut is applied to the threaded end of the pin to complete the joint, installation being done without exertion of percussion forces.

3 Claims, 1 Drawing Sheet

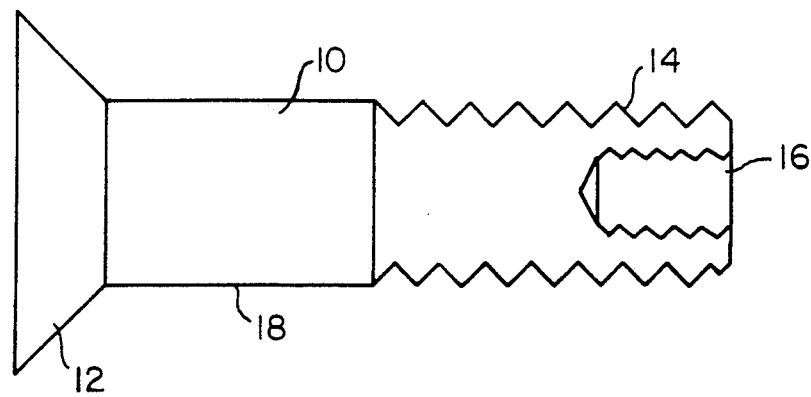
FIG. 1
FIG. 2
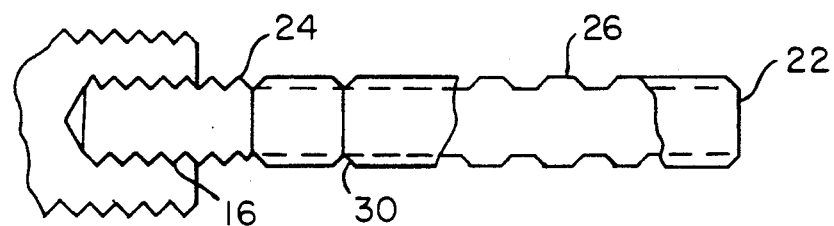
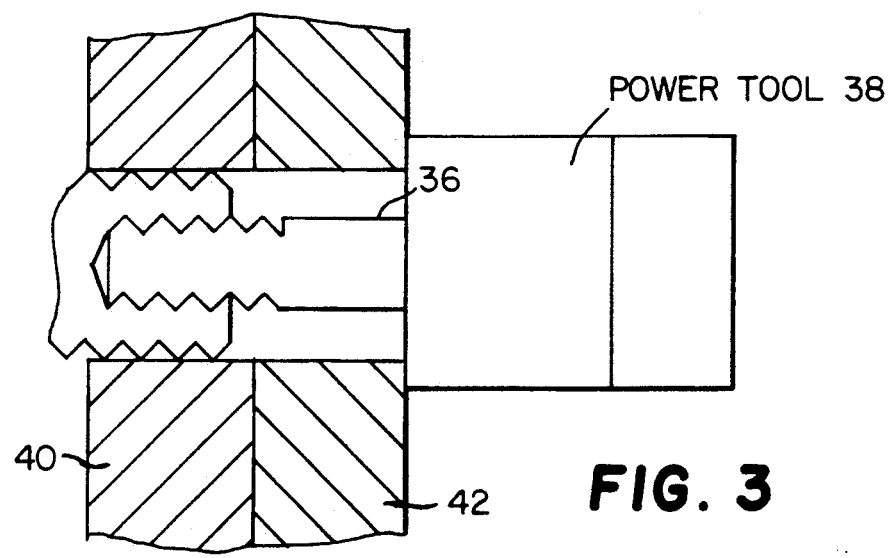
FIG. 3

FASTENER WITH INTERNAL THREADED INSTALLATION MEANS

BACKGROUND OF THE INVENTION

This invention relates to a fastener for use in interference fit holes to produce a fatigue resistant joint in highly stressed structures such as aircraft wings. It is well known in the art and can be seen in Wing U.S. Pat. Nos. 8,138,987 and 8,390,906 that fatigue resistant fasteners having a head, a smooth shank, an external thread and an internal wrenching feature coaxial with and at the same end as the thread are well known in the art of aircraft fastening. However, this fastener has problems when it is installed in interference fit holes.

The internal wrenching feature becomes unnecessary because the friction of the interference fit will prevent the fastener pin from turning when installing threaded nuts even when self locking friction devices are tightened onto the threaded end of the pin.

However, then the pin must be pounded into the hole using air hammers or presses using high forces which can deflect the structure or produce noise that is unacceptable in the modern industrial environment.

As an alternative method of interference fit installation, it is well known in the art to make a fastener pin with a pull stem protruding from the threaded, or grooved, end for applying a pulling force to install the pin in an interference fit hole in structure. Such devices are shown in many Jason U.S. Pat. No. 4,221,152, Schuster U.S. Pat. No. 2,955,505 and Dixon U.S. Pat. No. 4,324,518. In all of the prior art the pull stem requires an extra length of material which involves extra cost of production, that become particularly significant in fasteners manufactured from exotic metals such as titanium alloys. In this intent invention, the pulling mandrel can be from a cheaper, stronger material than the fastener pin, and can use more efficient manufacturing means to lower the cost further. Re-use of the pulling mandrel can be instituted if economically favorable.

Further, using the pin of this invention, a tool as shown in Wing et al Pat. No. 2,789,619 can be used with an integrated mandrel to rotate the mandrel into the threaded hole of the pin, pull the pin into interference fit and rotate the mandrel out of engagement with the fastener pin, and this patent is incorporated wherein in its entirety by reference to show a suitable tool for the purpose.

An object of this invention is to provide a fastener pin with an internally threaded hole coaxial with the thread of the pin to which a mandrel can be engaged to pull the fastener threaded pin into interference fit with a workpiece hole.

A further object of this invention is to provide a hardened mandrel for engagement with the threaded hole in the pin to be used to pull the pin into interference engagement with a workpiece fastener hole.

Another object of this invention is to provide a safety groove in the hardened installation mandrel which safety groove will fail the mandrel before damaging the head of the fastener pin by tensile overload in installation.

Another object of this invention is to provide means on the mandrel to engage a power tool for installation of the fastener.

A further object of this invention is to adapt power tool means to engage the tapped hole in the fastener threaded end for pulling the fastener into an interference fit.

The above and other features of the invention will be fully understood from the following detailed description and the accompanying drawings, in which:

DESCRIPTION OF THE DRAWINGS

FIG. 1 is a plan view of a preferred embodiment of the invention;

FIG. 2 is a partial sectional view of the embodiment of FIG. 1 with a second embodiment of the invention;

FIG. 3 is a fragmentary section of the embodiment of FIG. 1 with an addition embodiment of the invention illustrated.

DESCRIPTION OF THE INVENTION

A preferred embodiment of the invention is shown in FIG. 1. A threaded pin 10 has a head 12 and a threaded section 14. An internal thread 16 is coaxial with the external thread 14 and located in the threaded end of the pin 10. The threaded hole 16 is to be used for pulling the fastener 10 into engagement of its smooth shank 18 with the internal surface of structural members fastener hole in structure intended for highly stressed use such an aircraft wing.

FIG. 2 shows a mandrel 22 that has threaded end 24 and a grooved tail 26 removably engaged in the thread 16 of the embodiment of FIG. 1. The hardened mandrel tail 26 is grooved to engage gripping collets or other means used by conventional pulling tools to pull the fastener pin 10 into structural members 40 and 42 as shown in the embodiment of FIG. 3.

The mandrel 22 of FIG. 2 also has a safety groove 30 in its periphery. The groove 30 is designed to fail before the load pulling the fastener pin 10 into a structural member exceeds the tensile capacity of the fastener head 12.

After the fastener pin has been pulled into a structural member by means of the mandrel 22, the mandrel may be disengaged from the pulling tool and unthreaded from thread 16 of the fastener pin 10.

In FIG. 3 another embodiment of the invention may be seen where a mandrel 36 is a part of a power tool 38 and is used for installation of the fastener pin 10. The mandrel 36 is rotated to engage the tapped hole 16 of the fastener pin 10. The mandrel 36 is rotated manually or by the power tool 38. A hydraulic or pneumatic cylinder within the power tool 38 then pulls the mandrel and its attached fastener pin 10 into the fastener installation hole in the workpiece. The mandrel 36 is then rotated by the power tool, or manually, out of thread 16 in the fastener pin 10.

This invention is not to be limited by the embodiments shown in the drawings and described in the description which are given by way of example and not of limitation, but only in accordance with the scope of the appended claims.

I claim:

1. A fastener for assembling workpiece members comprising;

a pin member, said pin member having head end section and a smooth shank section, and an external retaining means end section, said pin member having a longitudinal axis, said head, shank and external retaining means co-axial with said longitudinal axis, and internal thread means, said internal thread means co-axial with said longitudinal axis and said internal thread means located at said external retaining means section end of said pin member and opening at the end;

in which said retaining means is a plurality of external grooves, and which further includes a fastener retainer member in the form of a collar member, said collar member having a smooth bore, and being adapted to be swaged into said external grooves.

2. A fastener for assembling workpiece members comprising:

a pin member, said pin member having a head end section and a smooth shank section, and an external retaining means end section, said pin member having a longitudinal axis, said head, shank and external retaining means co-axial with said longitudinal axis, and internal thread means, said internal thread means co-axial with said longitudinal axis and said internal thread means located at said external retaining means section end of said pin member and opening at the end;

said fastener further including mandrel means, said mandrel means having a longitudinal axis, said mandrel means having an externally threaded end and grooved end means;

said externally threaded end adapted to be removably engaged with said internal thread means of said pin member;

said grooved end means adapted for engagement with pulling means.

3. A device according to claim 2 in which includes safety groove means, said safety groove member being located adjacent to said external thread end of said mandrel means, and adapted to fail under tensile pulling force before failure of said head end section in axial tension.

* * * * *